United States Patent [19]

Beattie

[11] Patent Number: 4,976,546

[45] Date of Patent: Dec. 11, 1990

[54] TWO COMPONENT FLUID MIXING AND DISPENSING SYSTEM

[76] Inventor: Lewis J. Beattie, 3414 Willet Dr., Rochester Hills, Mich. 48309

[21] Appl. No.: 351,416

[22] Filed: May 12, 1989

[51] Int. Cl.[5] .......................... B01F 5/12; B01F 15/04; G05D 11/00

[52] U.S. Cl. .................................... 366/162; 222/135; 366/19

[58] Field of Search ............... 366/160, 161, 162, 152, 366/16, 19; 222/135; 417/429, 426

[56] References Cited

U.S. PATENT DOCUMENTS

| | | | |
|---|---|---|---|
| 3,174,649 | 3/1965 | Richardson | 222/135 |
| 3,694,108 | 9/1972 | Pensa | 417/426 |
| 3,810,720 | 5/1974 | Lartigue | 222/135 |
| 4,132,483 | 1/1979 | Slaats | 366/162 |
| 4,171,191 | 10/1979 | Krueger | 366/162 |

*Primary Examiner*—R. W. Jenkins

*Attorney, Agent, or Firm*—Reising, Ethington, Barnard, Perry & Milton

[57] ABSTRACT

A fluid mixing apparatus (10) for combining into a uniform mixture at least two liquid components includes a reciprocating left positive displacement pump (18) and a reciprocating right positive displacement pump (20) isolated from the left pump (18). The left pump includes a first metering cylinder (22) associated with a first liquid component and a second metering cylinder (24) associated with a second liquid component. The right pump (20) includes a first metering cylinder (26) associated with the first liquid component and a second metering cylinder (28) associated with the second liquid component. While the left pump (18) is measuring a predetermined volume of the first and second liquid components, the right pump (20) is pumping a predetermined volume of the first and second liquid components to a receptacle (14), and vice versa for when the right pump (20) is measuring in order to provide a continuous flow of the first and second liquid components to the receptacle (14).

50 Claims, 5 Drawing Sheets

TWO COMPONENT FLUID MIXING AND DISPENSING SYSTEM

TECHNICAL FIELD

The subject invention relates to an apparatus for combining into a uniform mixture at least two liquid components, and more particularly, to an apparatus for precisely measuring predetermined volumes of oil and water and continuously pumping the measured oil and water through a mixer to a storage receptacle.

BACKGROUND ART

Cutting fluids are used in many metal-cutting operations, as well as in grinding, to maintain optimum production rates, minimize tool wear, improve surface finish, etc. One of the primary types of cutting fluids comprise emulsified oils. Emulsified oils form mixtures ranging from emulsions to solutions when mixed with water which, due to their high specific heat, high thermal conductivity, and high heat of vaporization, are one of the most effective cooling media known. Blended with water, usually in the ratio of 1 part oil to 15–20 parts water for cutting, and 40 to 60 parts water for grinding, the water miscible fluids provide excellent cooling and lubrication for metal cutting at high speeds and light pressures.

Usually, a metal forming machine is equipped with its own reservoir of cutting fluid, from which the cutting fluid is drawn for discharge into the cutting area. The cutting fluid is recirculated back to the reservior for reuse. A substantial quantity of the cutting fluid, however, is lost during operation as a result of evaporation and as metal chips are removed. The reservoir, therefore, must be refilled on a frequent basis. When a plant must supply cutting fluid for a large number of metal forming machinings, it becomes imperative that a sufficiently high volumetric flow rate apparatus be provided for supplying cutting fluid to the reservoirs.

As alluded to above, it is also imperative that a proper ratio of oil and water be blended. The precise ratio is determined by carefully considering such factors as the type of machining operation being preformed, the speed at which material is removed, the type of material being machined, etc. An unfavorable or excessive change from the optimum oil/water ratio can possibly result in catastrophic damage to the workpart and/or tool.

Therefore, relating to cutting fluids in general, it is important that a precise ratio between the oil and the water be provided on a continuous basis, and also that a continuous high volumetric flow of the cutting fluid be made available for the metal forming machines.

Examples of the prior art apparatus for transferring liquids may be had in the U.S. Pat. Nos. 3,810,720 to Lartigue et al, issued May 14, 1974, and 3,174,649 to Richardson, issued Mar. 23, 1965. These references disclose apparatus for withdrawing from different vessels predetermined amounts of different liquid media and then combining the media into a single vessel. The apparatuses disclosed in these references, however, are not capable of delivering a continuous flow of measured liquid components to the receptacle as a loss of flow to the receptacle occurs while the respective apparatuses perform the step of measuring the select liquids.

SUMMARY OF THE INVENTION AND ADVANTAGES

The subject invention provides a fluid mixing apparatus of the type for combining into a uniform mixture two liquid components. The apparatus comprises a fluid pump means for measuring a predetermined volume of a first liquid component and a predetermined volume of a second liquid component and for pumping the measured volumes of the first and second liquid components. A receptacle means is included for receiving and containing the first and second liquid components pumped from the fluid pump means. A mixer means is disposed between the receptacle means and the fluid pump means for uniformly mixing the first and second liquid components. The subject invention is characterized by the fluid pump means including a continuous flow means for continuously measuring and pumping the predetermined volumes of the first and second liquid components without loss of flow to the receptacle means.

The subject invention also provides a method for combining into a uniform mixture two or more liquid components. The method comprises the steps of measuring a predetermined volume of a first liquid component, measuring a predetermined volume of a second liquid component, simultaneously pumping the measured first and second components to a receptacle, and characterized by simultaneously and continuously measuring and pumping the predetermined volumes of the first and second components without loss of flow to the receptacle.

The subject invention overcomes disadvantages inherent in the prior art in that the continuous flow means is provided for simultaneously measuring and pumping the predetermined volumes of the first and second liquid components. The simultaneous measuring and pumping allows a continuous flow of mixed first and second liquid components to the receptacle means. The subject invention is particularly advantageous in the production of emulsified oil type metal cutting fluids wherein water soluble oil and water are mixed in predetermined ratios and provided for supply to a metal working machine.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
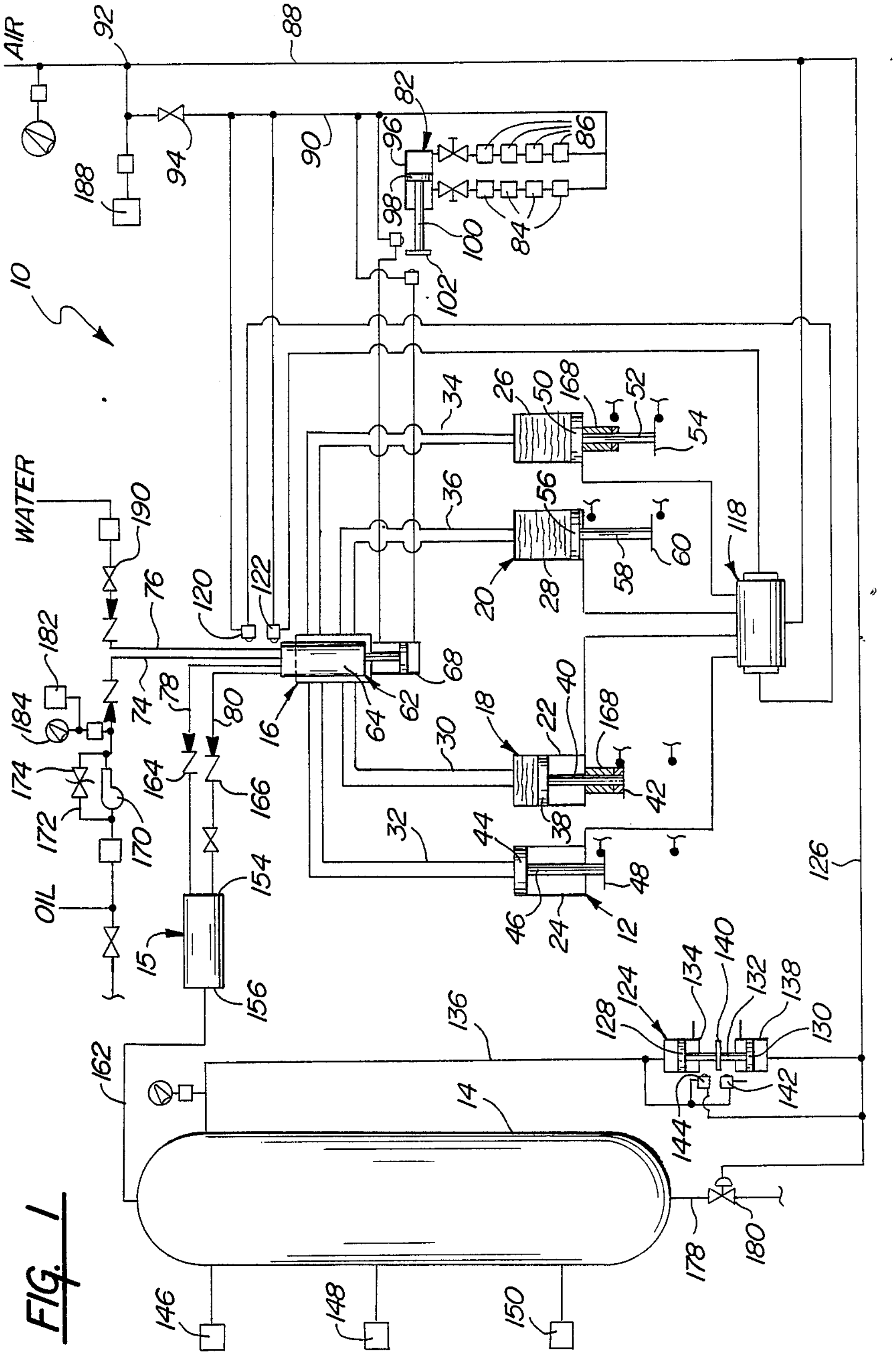
FIG. 1 is a schematic diagram of a fluid mixing apparatus according to the subject invention.

A schematic diagram of the subject fluid mixing apparatus is generally shown at 10 in FIG. 1. The subject apparatus 10 is particularly adapted for combining into a uniform mixture two or more liquid components, and more specifically a water miscible oil and water. In many metal-cutting operations, cutting fluids are used to maintain optimum production rates, minimize tool wear, improve surface finish, etc. One primary type of cutting fluid comprises emulsified oil. Such emulsified oils form mixtures ranging from emulsions to solutions when mixed with water which, due to its high specific heat, high thermal conductivity, and high heat vaporization, is one of the most effective cooling media known. The emulsified oil is formed by blending water miscible oil with water in critical, predetermined ratios usually in the range of 15 to 20 parts water for 1 part of oil for cutting, and 40 to 60 parts water for grinding.

Figure 2:
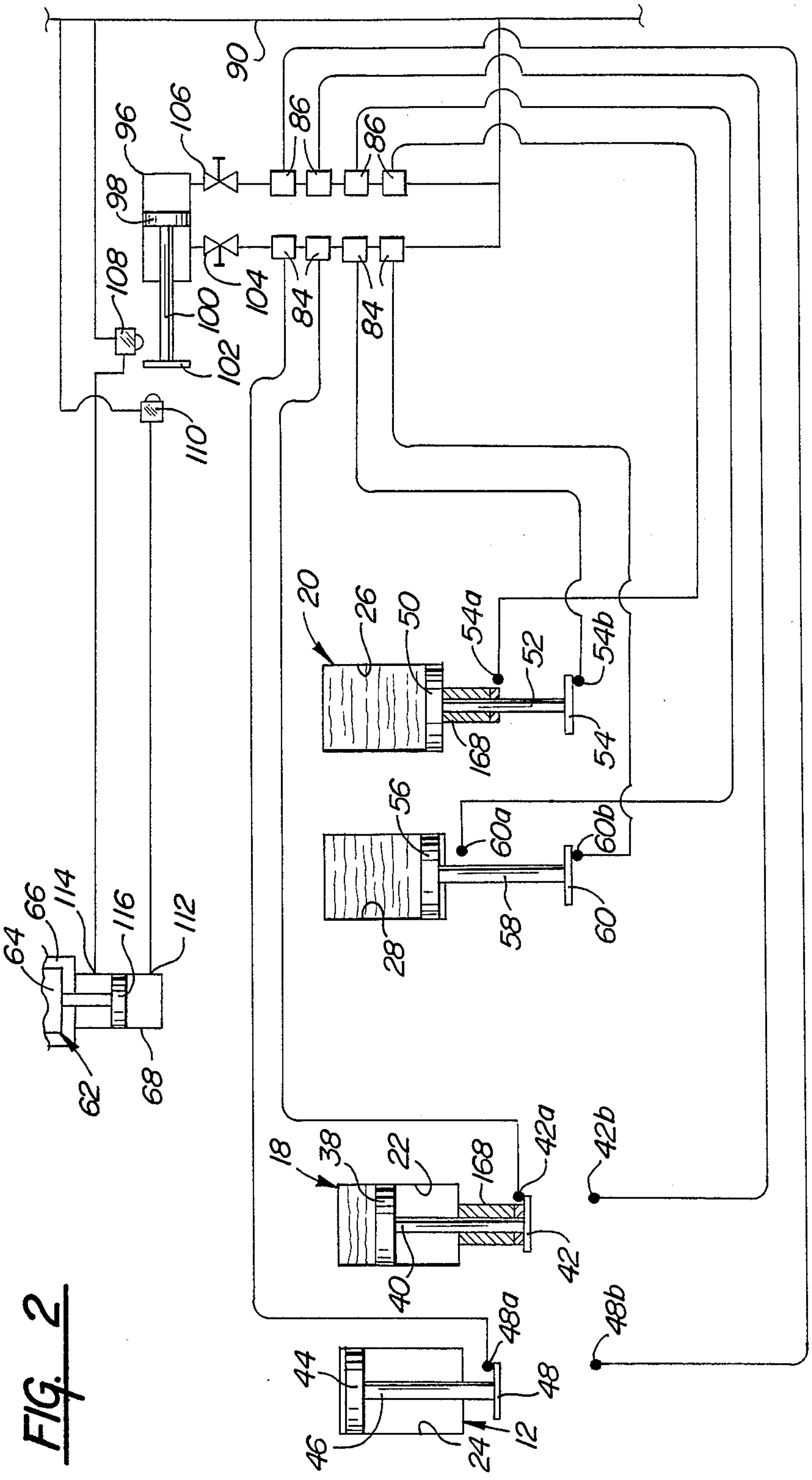
FIG. 2 is a schematic diagram of the fluid pump means of the subject invention.
Figure 4:
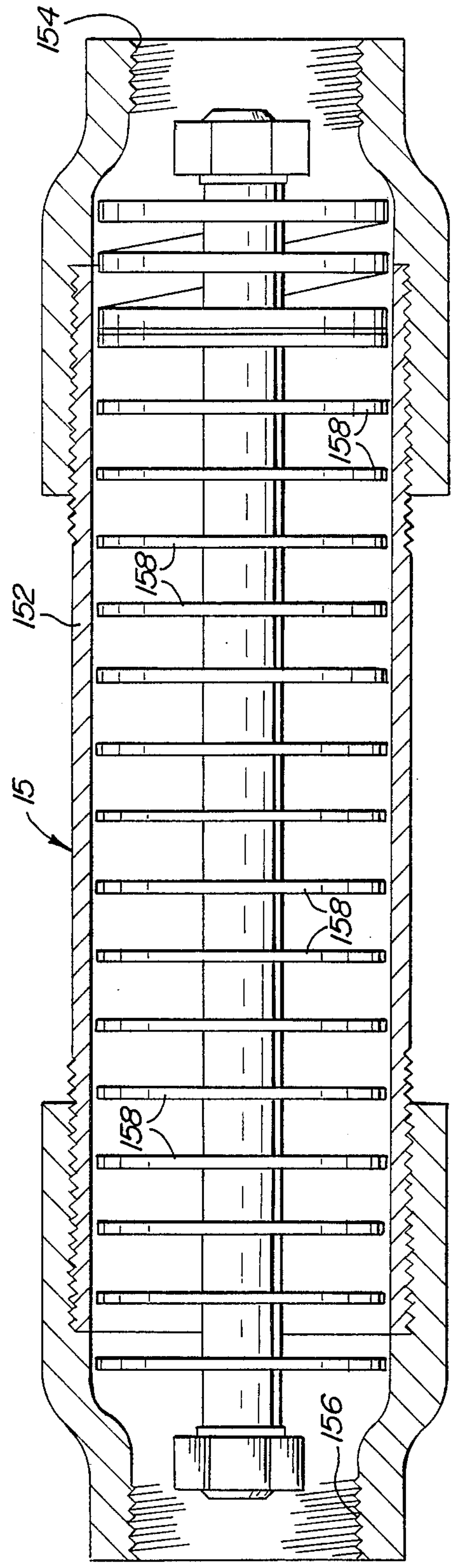
FIG. 4 is a cross-sectional view of the mixer means.

Referring now to FIGS. 1, 2 and 4, the subject apparatus 10 comprises a fluid pump means, generally indicated at 12, for measuring a predetermined volume of a first liquid component and a predetermined volume of a second liquid component and for pumping the measured volumes of the first and second liquid components. A receptacle means 14 is provided for receiving and containing the first and second liquid components pumped from the fluid pump means 12. A mixer means 15 is disposed between the receptacle means 14 and the fluid pump means 12 for uniformly mixing the first and second liquid components. The subject apparatus 10 is characterized by the fluid pump means 12 including a continuous flow means, generally indicated at 16, for continuously measuring and pumping a predetermined volume of the first and second liquid components without loss of flow to the receptacle means 14. That is, as will be described in greater detail subsequently, the continuous flow means 16 of the subject invention 10 allows the fluid pump means 12 to continuously and simultaneously measure and pump a predetermined volume of the first and second liquid components in order that a continuous, uninterrupted flow of both liquid components are supplied to the receptacle means 14.

Preferably, and for purposes of illustration, the first liquid component comprises the water miscible oil and the second liquid component comprises water. Although other liquid components are contemplated within the scope of the broadest claims, the first and second liquid components will be periodically referenced as the preferred oil and water components when clarity of description necessitates.

Referring now exclusively to FIGS. 1 and 2, the fluid pump means 12 of the subject apparatus 10 includes a reciprocating left positive displacement pump, generally indicated at 18, which is movable between an intake stroke to measure the predetermined volumes of the first and second liquid components and an exhaust stroke to pump the predetermined volumes of the first and second liquid components to the receptacle means 14. Likewise, the fluid pump means 12 also includes a reciprocating right positive displacement pump, generally indicated at 20, which is also moveable between an intake stroke to measure the predetermined volume of the first and second liquid components and an exhaust stroke to pump the predetermined volumes of the first and second components to the receptacle means 14. The left 18 and right 20 pumps are isolated from one another and operate separately to measure and pump the predetermined volumes of the oil and water components as the left 18 and right 20 pumps are moved through their respective intake and exhaust strokes.

More particularly, the left pump 18 includes a first metering cylinder 22 which is associated with the first liquid component and a second metering cylinder 24 associated with the second liquid component. Similarly, the right pump 20 includes a first metering cylinder 26 associated with the first liquid component in a second metering cylinder 28 associated with the second liquid component. A left oil intake conduit 30 extends from a supply of oil to the first metering cylinder 22 of the left pump 18 for communicating oil to the first metering cylinder 22. Likewise, a left second intake conduit 32 extends from the water supply to the second metering cylinder 24 supplying water to the second metering cylinder 24 during its intake stroke. Similarly, a right first intake conduit 34 extends from the oil supply to the first metering cylinder 26 and a right second intake conduit 36 extends from the water supply to the second metering cylinder 28 of the right pump 20.

The left pump 18 includes a first piston 38 slideably disposed in the first metering cylinder 22 between a terminal intake stroke position and a terminal exhaust stroke position. A piston rod 40 extends straight and axially from the first piston 38, through the first metering cylinder 22. An actuator 42 is fixedly disposed on the piston rod 40 on the distal end thereof, spaced from the first piston 38. A second piston 44 is slideable disposed in the second metering cylinder 24 of the left pump 18. The second piston 44 is slideable between a terminal intake stroke position and a terminal exhaust stroke position in like manner to the first piston 38. A piston rod 46 extends straight and axially from the second piston 44, through the second metering cylinder 24. An actuator 48 is disposed on the distal end of the rod 46 in like manner.

Similarly, the right pump 20 includes a first piston 50 slideably disposed in the first metering cylinder 26 of the right pump 20 slideable between a terminal intake stroke position and a terminal exhaust stroke position. A piston rod 52 extends axially from the first piston 50, through the first metering cylinder 26, and includes an actuator 54 fixedly disposed on the distal end thereof. Also, the right pump 20 includes a second piston 56 slideably disposed in the second metering cylinder 28 between a terminal intake position and a terminal exhaust stroke position. The second position 56 includes a rod 58 extending axially therefrom through the associated second metering cylinder 28, and having an actuator 60 fixedly disposed on the distal end thereof.

Even though the metering cylinders 22, 24, 26, 28 of the left 18 and right 20 pumps are shown as distinct units, it will be appreciated by those skilled in the art that each of the first metering cylinders 22, 26 and each of the second metering cylinders 24, 28 may comprise integrated double-acting cylinders wherein the associated fluid is disposed on each side of the piston, with the two cylinders 22, 26 and 24, 28 being disposed in back-to-back fashion.

Figure 7:
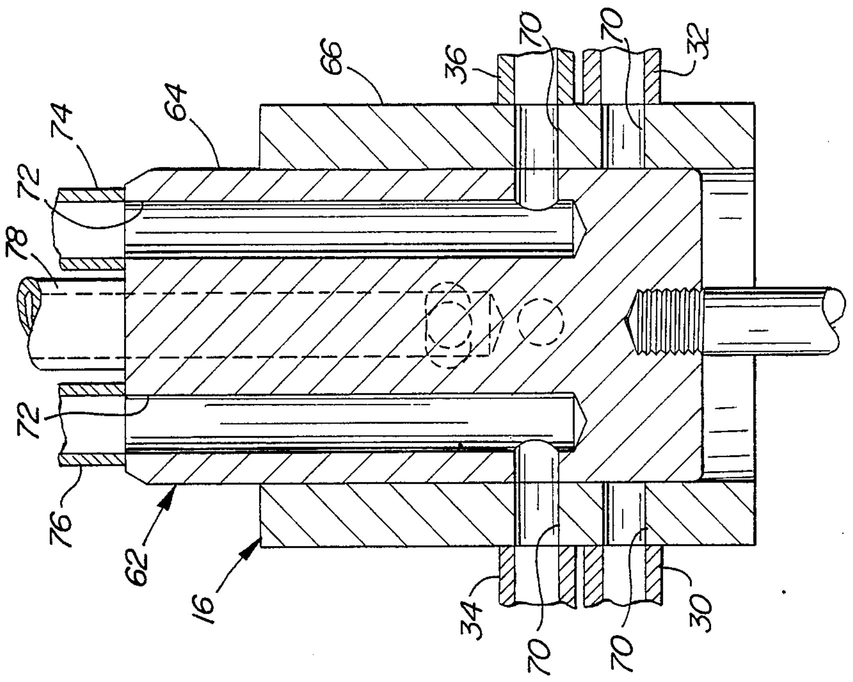
FIG. 7 is a cross-sectional view of the valve member of the control means shown in a second position.
Figure 6:
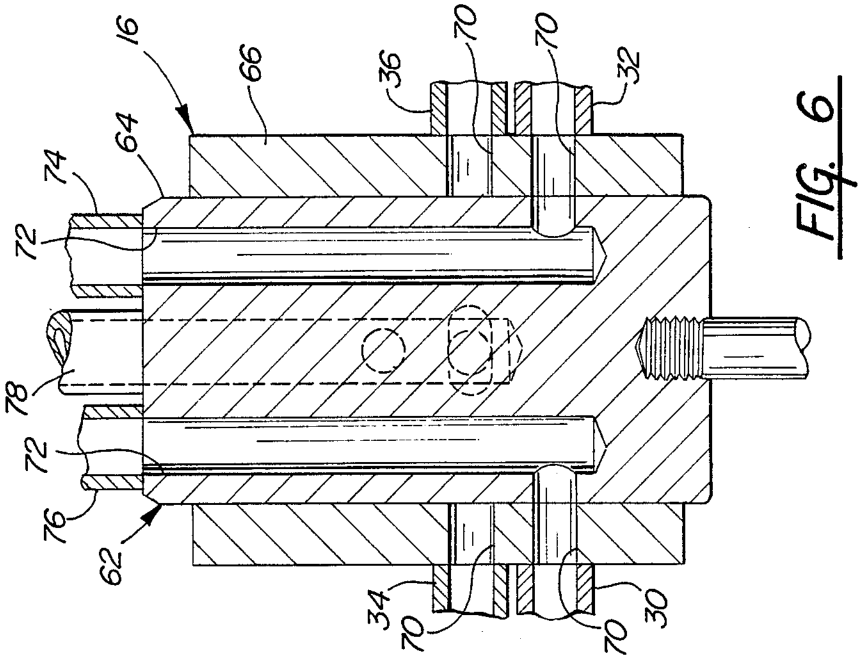
FIG. 6 is a cross-sectional view of the valve member of the control means shown in a first position.

Referring now to FIGS. 1, 6 and 7, the continuous flow means 16 includes a control means, generally indicated at 62, for controlling the movements of the left pump 18 between its intake and exhaust strokes and for controlling the movements of the right pump 20 to begin its intake stroke as the left pump 18 begins its exhaust stroke, and for the right pump 22 to begin its exhaust stroke as the left pump 18 begins its intake stroke. The control means 62, therefore, alternates the intake and exhaust strokes of the left 18 and right 20 pumps in such a manner that one of the pumps 18, 20 is delivering a flow of the first and second liquid components to the receptacle means 14, while the other pump 18, 20 is measuring a predetermined volume of the first and second liquid components in preparation for a subsequent delivery to the receptacle means 14.

The control means 62 includes a valve member 64 which is movable a first position (FIG. 6) wherein the first and second liquid components are directed toward the left pump 18 and away from the right pump 20, and a second position (FIG. 7) wherein the first and second liquid components are directed away from the left pump 18 and toward the right pump 20. As best shown in FIGS. 6 and 7, the valve member 64 is of the spool-type wherein a stationary sleeve 66 is provided about the moveable valve member 64. The valve member 64 is axially reciprocated within the sleeve 66 by an air actuator 68. This sleeve 66 provides structure to which the various intake conduits 30, 32, 34, 36 are attached, as well as other conduits to be described subsequently. Eight radially extending ports 70 extend through the sleeve 66, four of the ports 70 alternately communicate with four flow passages 72 in valve member 64 as the valve member 64 is reciprocated between the first and second positions. A first liquid supply conduit 74 communicates with one of the flow passages 72 of the valve member 64, and a second supply conduit 76 communicates with another of the flow passages 72 of the valve member 64. Similarly, a first exhaust conduit 78 communicates with one of the flow passages 72 in the valve member 64 for directing pumped oil from either of the left 18 or right 20 pumps to the receptacle means 14, and a second exhaust conduit 80 directs exhausted water from one of the left 18 or right 20 pumps to the receptacle means 14.

The continuous flow means 16 also includes a series of switches associated with the terminal exhaust stroke position and terminal intake stroke positions of each of the first 38, 50 and second 44, 56 pistons of the left 18 and right 20 pumps for actuation by the associated actuators 42, 48, 54, 60. More specifically, as shown in FIGS. 1 and 2, the first metering cylinder 22 or the left pump 18 includes a switch 42*a* associated with the terminal exhaust stroke position of the actuator 42 and a switch 42*b* associated with the terminal intake stroke position of the actuator 42. In like manner, switches associated with the terminal exhaust stroke positions of each of the remaining metering cylinders 24, 26, 28 are designated reference number associated actuator followed by the letter "a" and the switch associated with the terminal intake positions of the remaining metering cylinders 24, 26, 28 are designated by the reference number of the associated actuator 48, 54, 60 followed by the letter "b". The switches associated with the actuators 42, 48, 54, 60 are preferably of the normally-closed pneumatic type wherein compressed air is caused to move through the switch when contacted by the associated actuator 42, 48, 54, 60.

Referring again to FIGS. 1 and 2, the continuous flow means 16, includes a comparator means, generally indicated at 82, for comparing the individual actuation of each of the switches 42*a/b*, 48*a/b*, 54*a/b* and 60*a/b*. The comparator means 82 signals the control means 62 when the first 38 and second 44 pistons of the left pump 18 have reached their respective intake stroke terminal positions and the first 50 and second 56 pistons of the right pump 20 have reached their respective exhaust stroke terminal positions. Alternatively, the comparator means 82 signals the control means 62 when the first 38 and second 44 pistons of the left pump 18 have reached their respective exhaust stroke terminal positions and the first 50 and second 56 pistons of the right pump 20 have reached their respective intake stroke terminal positions. More particularly, the comparator means 82 includes a first bank of normally closed pneumatic switches 84 and a second bank of normally closed pneumatic switches 86. The first bank of switches 84 comprises four individual normally closed pneumatic switches 84. Two of the switches 84 communicate with the terminal exhaust stroke position of the switches 42*a* and 48*a* and the other two switches 84 communicate with the two terminal intake stroke position switches 54*b* and 60*b*. Likewise, the second bank of switches 86 comprises four individual pneumatic switches 86 which are of the normally-closed type. Two of the switches 86 communicate with the two terminal intake stroke position switches 42*b* and 48*b* and the other two switches 86 communicate with the two terminal exhaust position switches 54*a* and 60*a*.

Compressed air is supplied from an energy source, such as an air compressor, via a main air conduit 88. A branch conduit 90 communicates with the main air conduit 88 at an upstream tap 92. The branch conduit 90 includes a pneumatic valve 94 which, when actuated, allows air flow through the branch conduit 90. Each of the first 84 and second 86 banks of switches communicate with the compressed air flow in the branch conduit 90 downstream of the pneumatic valve 94. As each of the individual switches 84 and 86 are of the normally-closed type, air flow is prevented through each until their associated switches 42*a/b*, 48*a/b*, 54*a/b*, 60*a/b* are actuated. When each of the four switches of either bank 84 or 86 are simultaneously actuated, a signal is sent to the control means 62 indicating that the valve member 64 is to change from the first position to the second position or vice versa.

The comparator means 82 includes an air cylinder 96 extending between opposite ends. One end of the air cylinder 96 communicates with the air flow through the first bank of switches 84 and the other end of the air cylinder 96 communicates with the air flow through the second bank of switches 86. An air ram 98 is axially movable within the air cylinder 96 and is responsive to compressed air from either of the first 84 or second 86 bank of switches. A shaft 100 extends straight and axially from the ram 98, through the air cylinder 96. A camming element 102 is fixed to and movable with the ram 98 via its disposition on the end of shaft 100.

The comparator means 82 further includes a dwell means for delaying the signal sent to the control means 62 for a predetermined period of time. More particularly, the dwell means includes a first needle valve 104 disposed upstream of the air cylinder 96 and downstream of the first bank of switches 84, and also a second needle valve 106 disposed upstream of the air cylinder 96 and downstream of the second bank of switches 86. The predetermined period of time which the signal sent to the control means 62 is delayed can be adjusted via the first 104 and second 106 needle valves. Specifically, as one of the banks 84 or 86 of switches become fully actuated, thereby allowing air flow through to the air cylinder 96, the volumetric flow rate of the compressed air will be altered by adjusting the associated needle valve 104, 106 and thereby more slowly or more quickly allowing compressed air to enter the cylinder 96. This has the effect of increasing or decreasing the rate of response of the ram 98.

As referenced above, the movement of the valve member 64 between its first and second positions is responsive to the signals sent from the comparator means 82. More particularly, and as best shown in FIG. 2, the comparator means 82 includes a first position switch 108 for signaling the valve member 64 to move toward its first position and a second position switch 110 for signaling the valve member 64 to move toward its second position. The first 108 and second 110 position switches preferably comprise normally closed-type pneumatic valves. The linear reciprocator 68 includes a first position air inlet port 112 and a second position air inlet port 114. The linear actuator 68 also includes an air pressure responsive piston 116 which is movable between the first position inlet port 112 and second position inlet port 114. The first 108 and second 110 position switches of the comparator means 82 communicate with the branch conduit 90 for allowing a flow of compressed air from the branch conduit 90 to the respective inlet ports 112 and 114 in response to the actuation thereof by the camming element 102. Therefore, as either one of the first 84 or second 86 bank of switches become fully actuated, compressed air entering the cylinder 96 at an adjusted rate moves the camming element 102 toward one of the first 108 or second 110 position switches. Actuation of one of the first 108 or second 110 position switches allows a flow of compressed air from the branch conduit 90 to the linear actuator 68, which in turn urges the valve member 64 toward either the first position (FIG. 6) or the second position (FIG. 7).

A spool valve means is generally indicated at 118 in FIG. 1. The spool valve means 118 is responsive to the relative position of the valve member 64 for alternately directing compressed air from the main air conduit 88 to one of the left 18 or right 20 pumps. More particularly, the control means 62 includes a position sensor means 120, 122 associated with the valve member 64 for sending a compressed air signal to actuate the spool valve means 118 in response to the instantaneous position of the valve member 64. The position sensor means 120, 122 includes a normally closed left pump switch 120 for sending a compressed air signal from the branch conduit 90 to the spool valve means 118 to direct the flow of compressed air to the first 22 and second 24 metering cylinders of the left pump 18. The left pump switch 120 is of the normally closed type for allowing a flow of compressed air therethrough upon actuation by the valve member 64. The position sensor means 120, 122 also includes a right pump switch 122 for sending a compressed air signal from the branch conduit 90 to the spool valve means 118 to direct compressed air to the first 26 and second 20 metering cylinders of the right pump 20. The right pump switch 122 is of the normally open type wherein actuation by the valve member 64 will prevent the flow of compressed air therethrough. When the valve member 64 is the first position, neither of the left 120 or right 122 pump switches will be actuated, thereby allowing a flow of compressed air through the normally open right pump switch 122 to the spool valve means 118. As the valve member 64 begins to move upwardly from the first position toward the second position, the right pump switch 122 is immediately actuated to prevent further air flow therethrough. When the valve member 64 comes into contact with the normally closed left pump switch 120, air flow is allowed to pass to the spool valve means 118, thereby changing its position. As best shown in FIGS. 6 and 7, the upper peripheral edge of the valve member 64 is beveled in order to provide a camming surface to better actuate the left 120 and right 122 pump switches.

In the alternative embodiment described above, wherein the left 18 and right 20 pumps are integrated to form double acting cylinder units, it will become apparent to those skilled in the art that the spool valve means 118 and the associated position sensor means 120, 122 will be eliminated. This is because, in a double acting cylinder arrangement, the fluid pressure of the liquid allowed to enter one side of the double acting cylinder is used to urge the liquid on the other side of the piston out. Therefore, there is no need for the spool valve means 118 which directs compressed air to the left 18 and right 20 pumps to expel the liquid contained therein.

The receptacle means 14 includes a pressure regulator means, generally indicated at 124 in FIG. 1, for regulating the static air pressure inside the receptacle means 14. Preferably, a sufficiently high air pressure is maintained in the receptacle means 14 in order to urge fluid therefrom to the discharge site. More particularly, the compressed air provided through the main air conduit 88 is supplied at a predetermined range of pressures from the compressed air source, for example, between 80 and 120 psi. The pressure regulator means 124 communicates with the main air conduit 88 via a branch conduit 126. The pressure regulator means 124 includes a static pressure comparator for comparing the static air pressure inside the receptacle means 14 with the static air pressure of the compressed air source inside the branch conduit 126. The static pressure comparator comprises a receptacle piston 128 responsive to the static pressure inside the receptacle means 14, and a compressed air source piston 130 responsive to the static pressure in the branch conduit 126. The receptacle piston 128 and compressed air source piston 130 are integrally connected via a shaft 132. The receptacle piston 128 is supported within a receptacle cylinder 134 which communicates with a receptacle means 14 via a regulator conduit 136. The compressed air piston 130 is housed within a compressed air source cylinder 138 which communicates compressed air with the conduit branch 126.

An actuator plate 140 is fixedly disposed on the shaft 132 between the receptacle piston 128 and the compressed air source piston 130. A normally closed pneumatic bleed switch 142 is disposed adjacent the compressed air source cylinder 138 for actuation by the actuator plate 140. Likewise, a pneumatic normally closed fill switch 144 is disposed adjacent the receptacle cylinder 134 for actuation by the actuator plate 140. The inlet to the bleed switch 142 and the outlet from the fill switch 144 each communicate with the regulator conduit 136. Whereas the inlet to the fill switch 144 communicates with the branch conduit 126, and the outlet from the bleed switch 142 exhausts to the atmosphere.

The pressure regulator means 124 operates by comparing the static pressure in the receptacle means 14 via the regulator conduit 136 and the static pressure in the branch conduit 126. This is accomplished by the connected receptacle piston 128 and compressed air source piston 130 in that a pressure build-up in the receptacle means 14, e.g., occurring during filling with the first and second liquid components, will cause the receptacle piston 128 to move and overcome the pressure in the compressed air source cylinder 138 from the branch conduit 126. This causes the actuator plate 140 to move toward and actuate the bleed switch 144 allowing compressed air from the receptacle means 14, via the regulator conduit 136, to exhaust to the atmosphere until the pressure inside the receptacle means 14 and the branch conduit 126 are stabilized. In the opposite situation, wherein the static pressure inside the receptacle means 14 falls below an optimum value, the compressed air in the branch conduit 126 will move the compressed air source piston 130 and overcome the pressure in the receptacle cylinder 134, thereby allowing the actuator plate 140 to actuate the fill switch 144. The fill switch 144 allows compressed air from the branch conduit 126 to flow into the receptacle conduit 136 and hence into the receptacle means 14. Preferably, the static pressure in the receptacle means 14 will be maintained to approximately one half the static air pressure in the branch conduit 126. This is accomplished by adjusting the surface area of the respective receptacle piston 128 and the compressed air source piston 130 in such that the receptacle piston 128 presents a surface area two times the surface area of the compressed air source piston 130.

Alternatively, the pressure regulator means 124 may be eliminated by using a pump to move liquid out of the receptacle means 14. In this alternative situation, a vent would necessarily be provided in the receptacle means 14 in order to prevent a build-up or vacuum of pressure inside the receptacle means 14.

Figure 3:
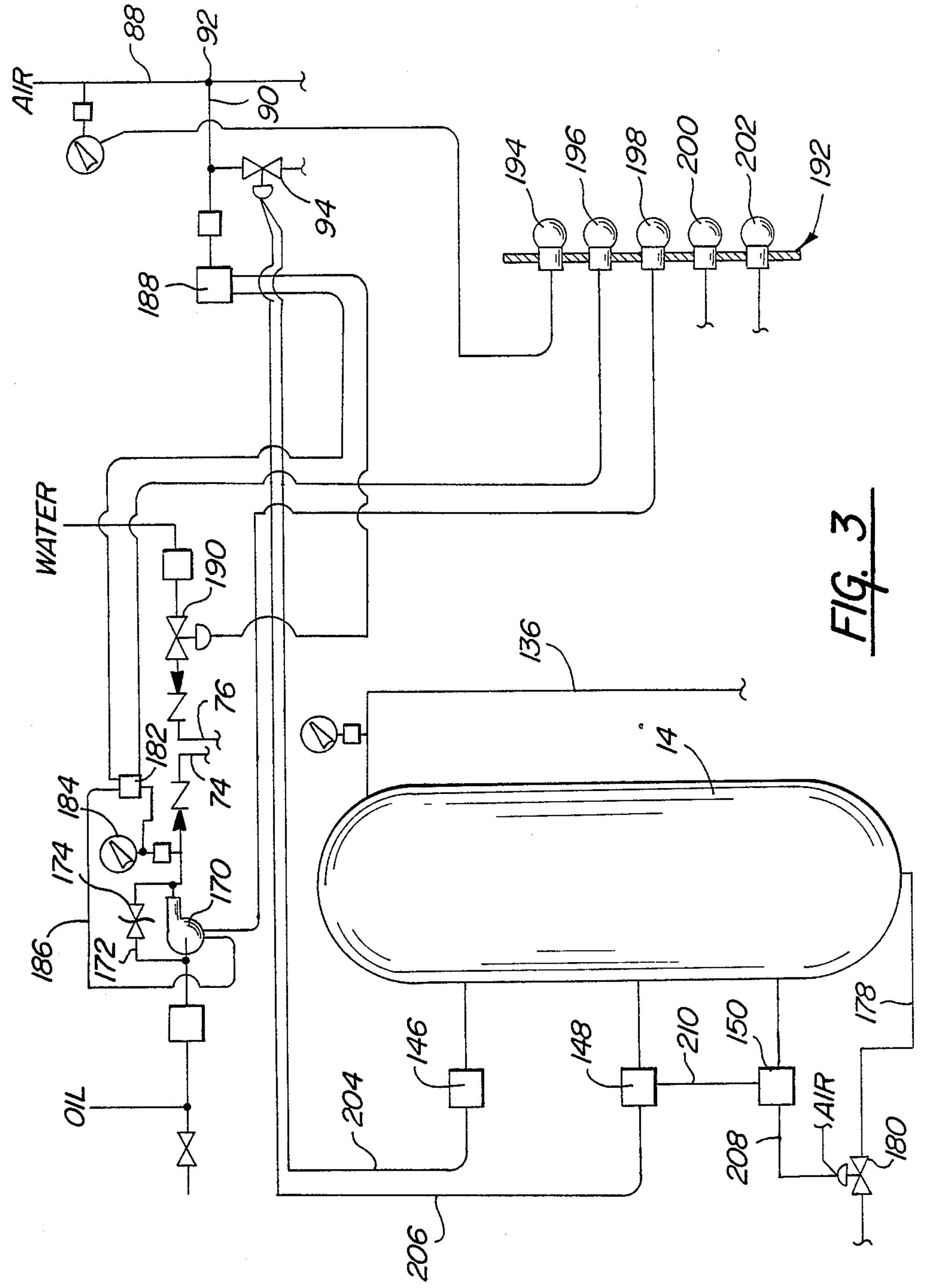
FIG. 3 is a schematic diagram of the electrical wiring provided in the preferred embodiment of the subject invention.

As best shown in FIG. 3, the receptacle means 14 includes an upper level sensor 146 for producing a signal when the liquid in the receptacle means 14 falls below an upper predetermined level. A middle level sensor 148 is spaced vertically below the upper level sensor 146 for producing a signal when the liquid in the receptacle means 14 falls below an intermediate predetermined level. Further, a lower level sensor 150 is spaced vertically below the middle level sensor 148 for producing a signal when the liquid in the receptacle means 14 falls below a lower predetermined level. The upper 146, middle 148 and lower 150 level sensors are preferably of the float type, which produce an electrical signal when actuated. The upper level sensor 146 is responsive to the presents of liquid at the upper predetermined level, and therefore sends a signal when the liquid in the receptacle means 14 rises above the upper predetermined level. However, the middle level sensor 148 and lower level sensor 150 are responsive to the absence of liquid and send their respective electrical signals when the liquid level in the receptacle means 14 falls below the respective predetermined levels. The function of the upper 146, middle 148 and lower 150 level sensors will be described with the operation of the entire system subsequently.

Figure 5:
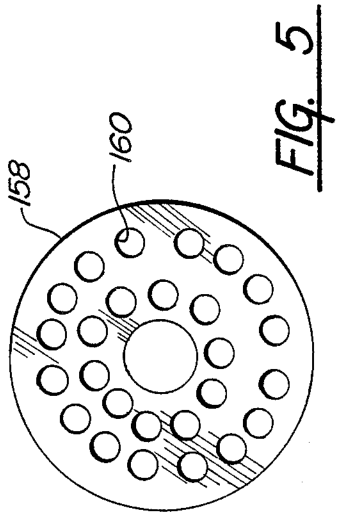
FIG. 5 is a plan view of a liquid permeable plate of the mixer means.

Referring now to FIGS. 4 and 5, the mixer means 15 includes an elongated tubular flow chamber 152 extending along a central axis thereof. The flow chamber 152 has an upstream end 154 for communicating with the fluid output from the control means 62 and a downstream end 156 communicating with the receptacle means 14. The upstream end 154, more specifically, communicates with the first 78 and second 80 exhaust conduits extending between the mixer means 15 and the valve member 64. The mixer means 15 includes a plurality of liquid permeable plates 158 spaced axially inside the flow chamber 152. The plates 158 are positioned perpendicular to the central axis of the flow chamber 152. A plan vieW of one of the liquid permeable plates 158 is shown at 155. Each liquid permeable plate 158 includes a series of circular openings 160 disposed symmetrically thereabout.

As oil and water fed through the first 78 and second 80 exhaust conduits enter the flow chamber 52, the turbulence created by the streams moving around and through the plates 158 effectively and efficiently mix the oil and water together by the time they reach the downstream end 156. A fill conduit 162 extends from the downstream end 156 of the flow chamber 152 to the receptacle means 14 for conveying the mixed oil and water to the receptacle means 14.

A first check valve 164 is disposed along the first exhaust conduit 78, between the mixer means 15 and the control means 62, for allowing oil flow from the valve member 64 to the flow chamber 152 and for preventing oil flow from the flow chamber 152 back to the valve member 64. Similarly, a second check valve 166 is disposed along the second exhaust conduit 80 for allowing water flow from the valve member 64 to the flow chamber 152 and for preventing water flow from the flow chamber 152 and back to the valve member 64. The first 164 and second 166 check valves, therefore, serve as part of the safety system for preventing the back flow of oil and water to the fluid pump means 12. It will become apparent to those skilled in the art that the check valves 164 and 166 can be eliminated for conditions when there is no pressure inside the receptacle means 14.

Typically, the oil and water are mixed in ratios such that substantially less oil is required than water. For example, one particular application for which the emulsified oil is to be supplied may require a mixture of 30 parts water to 1 part oil. Therefore, the volumetric difference between the first 22, 26 metering cylinders of the left 18 and right 20 pumps must reflect a 30:1 ratio with the second 24, 28 metering cylinders of the left 18 and right 20 pumps. Generally, the first metering cylinders 22, 26 will have a substantially smaller diameter than the second metering cylinders 24, 28. However, in order to provide for adjustment of the displacement of either the left 18 or right 20 pumps, a stroke limiter means 168 is provided for adjusting the displacement of at least one of the first 38, 50 or second 44, 56 pistons of the left 18 and right 20 pumps. More particularly, the stroke limiter means 168 preferably comprises a sleeve 168 disposed about the piston rod 40, 46, 52, 58 of either the first piston 38, 50 or the second piston 44, 56. As will be readily appreciated, the sleeve 168 mechanically limits the displacement of the respective first 22, 26 or second 24, 28 metering cylinders in order to provide a predetermined volumetric ratio between the oil and water. The sleeve 168 can be easily removed from its associated piston rod and exchanged for a sleeve 168 of a different length in order to alter the predetermined volumetric displacement thereof.

The subject apparatus 10 preferably includes a fluid pump 170 disposed upstream of the control means 62 for moving the first component from its associated supply to the control means 62. The fluid pump 170 is disposed along the first supply conduit 74 for moving the oil therein through the valve member 64 and either the left 18 or right 20 pump. The pressure in the oil created by the fluid pump 170, when directed to the left 18 and right 20 pumps, supplies the energy required to move the associated pistons 38, 44, 50, 56 from their terminal exhaust stroke position to their terminal intake stroke position. As is typical in the art, a bridge circuit 172 is provided around the fluid pump 170 and includes a safety valve 174.

A safety shut down means, or network of sensors, is provided for automatically shutting down the apparatus 10 in the event a fault condition occurs. Such fault conditions include lack of first liquid component supply, lack of air pressure, etc. Referring to FIG. 3, the safety shut down means includes a first component pressure sensor 182 for actuating the safety shut down means in the event the static pressure of the first liquid component falls below a predetermined value. More particularly, the first component pressure sensor 182 is disposed downstream of the fluid pump 170 and will function to shut down the subject apparatus 10 when the output pressure from the fluid pump 170 falls below a set limit. As shown, a pressure regulator 184 is disposed upstream of the first component pressure sensor 182, in a location visible to an operator, for visually displaying the instantaneous static pressure in the first supply conduit 74. The first component pressure sensor 182 operates by sending an electrical signal via the line 186 to the fluid pump 170, shutting down the pump 170 to prevent damage to the fluid pump 170, due to lack of oil.

The safety shut down means further includes a compressed air sensor 188 communicating with the branch conduit 90 for actuating the safety shut down means in the event the static pressure of the compressed air source falls below a predetermined value. When the compressed air pressure in the main air conduit 88 falls below the set limit, the compressed air sensor 188 sends two signals. One signal is sent to a pneumatic valve 190 disposed along the second supply conduit 76, upstream of the control means 62, for stopping the flow of water therethrough. The second signal is sent to the first component pressure sensor 182, which, in turn, relays the signal via the electric line 186 to instruct the fluid pump 170 to shut down.

The safety shut down means also includes an alarm, generally indicated at 192, for alerting an operator in the event the safety shut down means is actuated. More particularly, the alarm 192 includes a series of visual indicators, e.g., lights, which are actuated in response to the occurrence of a fault condition. Specifically, a warning lamp 194 is associated with the compressed air sensor 188 for displaying a lighted signal when the compressed air sensor 188 is actuated. Another warning lamp 196 is associated with the first component pressure sensor 182 for displaying a lighted signal in the event the first component pressure sensor 182 is actuated. A third warning lamp 198 is associated with the fluid pump 170 for displaying a lighted visually signal in the event an electrical circuit breaker in the fluid pump 170 is tripped. Further, a fourth warning lamp 200 is associated with the first liquid component supply (not shown) for displaying a visual signal to the operator when the supply is empty or in a depleted condition. Also, a fifth warning lamp 202 is associated with the electrical power supply for displaying a signal when the power supply to the subject apparatus 10 is on. Of course, it will be appreciated that additional warning lamps may be provided to indicate when other fault conditions occur in the system.

Alternatively, the safety shut down means may include an electronic programmable controller connected to each of the upper 146, middle 148 and lower 150 level sensors, the first component pressure sensor 182, the compressed air sensor 188, the fluid pump 170, and each of the pneumatic valves 94, 190 and 180. The programmable controller is preprogrammed to monitor each of the sensors, and to shut down the entire system in the event any one of the above-identified fault conditions occur.

OPERATION OF THE PREFERRED EMBODIMENT

By way of reference to the above described elements of the subject apparatus 10, the operation of the preferred embodiment will addressed presently. The method of the subject invention provides for combining to a uniform mixture at least two liquid components, and preferably for combining water miscible oil and water.

The method comprises the steps of measuring a predetermined volume of the first liquid component, measuring a predetermined volume of the second liquid component, simultaneously pumping the measured first and second liquid components to the receptacle means 14, mixing the first and second liquid components together as they are pumped to the receptacle means 14, and characterized by simultaneously continuously measuring and pumping the predetermined volumes of the first and second liquid components without loss of flow to the receptacle means 14. This is accomplished by moving the first and second liquid components to the left pump 18, moving the first and second liquid components to the right pump 20, measuring the first and second liquid components with the left pump 18 while pumping the first and second liquid components with the right pump 20, and alternately pumping the first and second liquid components with the left pump 18 while measuring the first and second liquid components with the right pump 20. The left 18 and right 20 pumps, in other words, alternate between the measuring and pumping functions to supply a continuous flow of mixed oil and water is supplied to the receptacle means 14.

The first and second liquid components are measured by the individual first 22, 26 and second 24, 28 metering cylinders of the left 18 and right 20 pumps as their respective pistons 38, 44, 50, 56 stroke from the terminal exhaust stroke position to the terminal intake stroke position. Conversely, the first and second liquid components are pumped to the receptacle means 14 by contracting the volumes of the individual metering cylinders 22, 24, 26, 28. The expansion (or contraction) of at least one of each of the two cylinders of the left 18 and right 20 pumps is adjusted, by means of the sleeve 168, to alter the mixing ratio between the first and second liquid components.

As oil and water are fed through the first 54 and second 56 supply conduits, respectively, the position of the valve member 64 relative to the sleeve 66 determines which of the left 18 or right 20 pumps are measuring or pumping the fluids. Assuming the valve member 64 is in the first position, as shown in FIG. 6, the oil and water are fed through the first 74 and second 76 supply conduits, respectively, to the left first intake conduit 30 and the left second intake conduit 32. The pressure of the oil and water force the respective pistons 38, 44 to move in their respective metering cylinders 22, 24 from the terminal exhaust stroke position toward the terminal intake stroke position. Meanwhile, the valve member 64 in the first position directs the expulsion of the oil and water from the first 26 and second 28 metering cylinders of the right pump 20 into the first 78 and second 80 exhaust conduits. Compressed air from the main air conduit 88, directed through the spool valve means 118, is directed to the back side of the first 50 and second 56 pistons of the right pump 20 for urging the pistons 50, 56 from their terminal intake stroke position toward their terminal exhaust stroke position.

When the exhaust stroke switches 54*a*, 60*a* of the right pump 20 have been actuated, and the intake switches 42*b*, 48*b* of the left pump 18 have been actuated, thereby opening each switch 86 in the second bank of switches 86, the camming element 102 of the comparator means 82 is moved toward and actuates the second position switch 110. This allows a flow of compressed air to enter the linear reciprocator 68 of the control means 62 at the first position inlet port 112, thereby urging the valve member 64 toward the second position as shown in FIG. 7.

In the second fluid directing position, the valve member 64 directs the flows of oil and water from the first 74 and second 76 supply conduits to the first 26 and second 28 metering cylinders of the right pump 20 via the right first intake conduit 34 and right second intake conduit 36, respectively. Fluid pressure from the oil and water urge the pistons 50, 56 from the terminal exhaust stroke positions toward the terminal intake stroke positions. Meanwhile, the left pump switch 120 and right pump switch 122 of the comparator means 62 have commanded the spool valve means 118 to shift positions and begin directing compressed air from the main air conduit 88 to the back side of the pistons 38, 44 of the left pump 18. This compressed air urges the measured volumes of the oil and water from their respective cylinders 22, 24, through the valve member 64 and into the first 78 and second 80 exhaust conduits. When the respective actuators 42, 48 of the left pump 18 have contacted their respective exhaust switches 42*a* and 48*a*, and when the respective intake switches 54*b* and 60*b* of the right pump 20 have been actuated, the entire first bank of switches 84 are simultaneously actuated allowing compressed air to urge the actuator 102 of the comparator means 82 back toward the first position switch 108. This, in turn, again applies the compressed air to the linear actuator 68 via the second inlet port 114 urging the valve member 64 back toward the first position as shown in FIG. 6.

The above-described cycle is continuously carried out in order to provide an uninterrupted flow of oil and water to the receptacle means 14. However, in the event that less emulsified oil is being withdrawn from the receptacle means 14 via the discharge conduit 178 than is being supplied to the receptacle means 14 via the fill conduit 162, the liquid level in the receptacle means 14 will rise up to and actuate the upper level sensor 146. Referring now to FIG. 3, when the upper level sensor 146 is actuated, a signal is sent via the electrical line 204 to the pneumatic valve 94 associated with the branch conduit 90. The signal from the upper level sensor 146 closes the pneumatic valve 94 and thereby prevents further air flow through the branch conduit 90. This effectively shuts down the comparator means 82 and consequently shuts down the entire fluid pump means 12.

When the liquid level in the receptacle means 14 falls below the intermediate level sensor 148, a signal will be sent via an electrical line 206 back to the pneumatic valve 94 opening the pneumatic valve and reinstating the operation of the comparator means 82 and consequently the fluid pump means 14.

In the event a greater flow rate of liquid is removed from the receptacle means 14 than can be supplied by the fluid pump means 12, the liquid level in the receptacle means will fall below and hence actuate the lower level sensor 150. The lower level sensor 150 will then send a signal via line 208 shutting off the pneumatic valve 180 associated with the discharge conduit 178. Also, the lower level sensor 150 will send a signal via line 210 through the intermediate level sensor 148, ensuring that the pneumatic valve 94 is in fact open and that the fluid pump means 12 is in operation refilling the receptacle means 14. As soon as the liquid level rises back above the middle level sensor 148, the pneumatic valve 180 will be reopened and discharge through the discharge conduit 178 reinstated.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A fluid mixing apparatus (10) of the type for combining into a uniform mixture at least two liquid components, said apparatus (10) comprising: fluid pump means (12) for measuring a predetermined volume of a first liquid component and a predetermined volume of a second liquid component and for pumping the measured volumes of the first and second liquid components; receptacle means (14) for receiving and containing the first and second liquid components pumped from said fluid pump means (12); mixer means (15) disposed between said receptacle means (14) and said fluid pump means (12) for uniformly mixing the first and second liquid components; and characterized by said fluid pump means (12) including continuous flow means (16) for continuously measuring and pumping the predetermined volumes of the first and second liquid components without loss of flow to said receptacle means (14).

2. An apparatus (10) as set forth in claim 1 further characterized by said fluid pump means (12) including a reciprocating left positive displacement pump (18) moveable between an intake stroke to measure the predetermined volume of the first and second liquid components and an exhaust stroke to pump the predetermined volumes of the first and second liquid components to said receptacle means (14), and a reciprocating right positive displacement pump (20) moveable between an intake stroke to measure the predetermined volume of the first and second liquid components and an exhaust stroke to pump the predetermined volumes of the first and second liquid components to said receptacle means (14).

3. An apparatus (10) as set forth in claim 2 further characterized by said continuous flow means (16) including control means (62) for controlling the movements of said left pump (18) between said intake and exhaust strokes and for controlling the movements of said right pump (20) to begin said intake stroke as said left pump (18) begins said exhaust stroke and to begin said exhaust stroke as said left pump (18) begins said intake stroke.

4. An apparatus (10) as set forth in claim 3 further characterized by said left pump (18) including a first metering cylinder (22) associated with the first liquid component and a second metering cylinder (24) associated with the second liquid component.

5. An apparatus (10) as set forth in claim 4 further characterized by said right pump (20) including a first metering cylinder (26) associated with the first liquid component and a second metering cylinder (28) associated with the second liquid component.

6. An apparatus (10) as set forth in claim 5 further characterized by said left pump (18) including a first piston (38) slideably disposed in said first metering cylinder (22) between a terminal intake stroke position and a terminal exhaust stroke position, and a second piston (44) slideably disposed in said second metering cylinder (24) between a terminal intake stroke position and a terminal exhaust stroke position.

7. An apparatus (10) as set forth in claim 6 further characterized by said right pump (20) including a first piston (50) slideably disposed in said first metering cylinder (26) between a terminal intake stroke position and a terminal exhaust stroke position, and a second piston (56) slideably disposed in said second metering cylinder (28) between a terminal intake stroke position and a terminal exhaust stroke position.

8. An apparatus (10) as set forth in claim 7 wherein said first (38, 50) and second (44, 56) pistons of each of said left (18) and right (20) pumps include a piston rod (40, 46, 52, 58) extending axially through the associated said first (22, 26) and second (24, 28) metering cylinder, and an actuator (42, 48, 54, 60) fixedly disposed on said piston rod (40, 46, 52, 58) spaced from said associated piston (38, 44, 50, 56), further characterized by said continuous flow means (16) including a switch (**42*a*, 48*a*, 54*a*, 60*a*) associated with said terminal exhaust stroke position and a switch (42*b*, 48*b*, 54*b*, 60*b*) associated with said terminal intake stroke position of each of said first (38, 50) and second (44, 56) pistons of said left (18) and right (20) pumps for actuation by said associated actuators (42, 48, 54, 60**).

9. An apparatus (10) as set forth in claim 8 further characterized by said continuous flow means (16) including comparator means (82) for comparing the individual actuation of each of said switches (**42*a*/*b*, 48*a*/*b*, 54*a*/*b*, 60*a*/*b*) to signal said control means (62) when said first (38) and second (44) pistons of said left pump (18) have reached said intake stroke terminal position and said first (50) and second (56) pistons of said right pump (20) have reached said exhaust stroke terminal position, and to signal said control means (62) when said first (38) and second (44) pistons of said left pump (18) have reached said exhaust stroke terminal position and said first (50) and second (56) pistons of said right pump (20**) have reached said intake stroke terminal position.

10. An apparatus (10) as set forth in claim 9 further characterized by said control means (62) including a valve member (64) moveable between a first position wherein the first and second components are directed toward said left pump (18) and away from said right pump (20), and a second position wherein the first and second components are directed away from said left pump (18) and toward said right pump (20).

11. An apparatus (10) as set forth in claim 10 further characterized by said valve member (64) including a linear reciprocator (68) for moving said valve member (64) linearly between said first and second positions in response to the signals from said comparator means (82).

12. An apparatus (10) as set forth in claim 11 further characterized by said linear reciprocator (68) including at least one compressed air inlet port (112, 114) for receiving a supply of compressed air to actuate said valve member (64).

13. An apparatus (10) as set forth in claim 11 further characterized by said comparator means (82) including an air cylinder (96) and a ram (98) axially moveable within said air cylinder (96) and responsive to compressed air.

14. An apparatus (10) as set forth in claim 13 further characterized by said comparator means (82) including a camming element (102) fixed to and moveable with said ram (98).

15. An apparatus (10) as set forth in claim 11 further characterized by said receptacle means (14) including pressure regulator means (124) for regulating the static air pressure inside said receptacle means (14).

16. An apparatus (10) as set forth in claim 15 wherein said apparatus (10) is supplied with compressed air at a predetermined range of pressures from a compressed air source (90), further characterized by said pressure regulator means (124) including a static pressure comparator for comparing the static pressure inside said receptacle means (14) with the static pressure of the compressed air source (90).

17. An apparatus (10) as set forth in claim 16 further characterized by said pressure regulator means (124) including a receptacle piston (128) in communication with the static pressure in said receptacle means (14) and a source air piston (130) in communication with the compressed air source (90).

18. An apparatus (10) as set forth in claim 16 further characterized by said receptacle means (14) including an upper level sensor (146) for producing a signal when the liquid in said receptacle means (14) rises above an upper predetermined level, a middle level sensor (148) spaced vertically below said upper level sensor (146) for producing a signal when the liquid in said receptacle means (14) falls below an intermediate predetermined level, and a lower level sensor (150) spaced vertically below said middle level sensor (148) for producing a signal when the liquid in said receptacle means (14) falls below a lower predetermined level.

19. An apparatus (10) as set forth in claim 18 further characterized by including spool valve means (118) responsive to the relative position of said valve member (64) of said control means (62) for alternately directing compressed air from the compressed air source (90) to one of said left (18) and right (20) pumps.

20. An apparatus (10) as set forth in claim 19 further characterized by said control means (62) including position sensor means (120, 122) associated with said valve member (64) for sending a compressed air signal to actuate said spool valve means (118) in response to the instantaneous position of said valve member (64).

21. An apparatus (10) as set forth in claim 19 further characterized by including safety shut down means for automatically shutting down said apparatus (10) in the event a fault condition occurs.

22. An apparatus (10) as set forth in claim 21 further characterized by said safety shut down means including a first component pressure sensor (182) for actuating said safety shut down means in the event the static pressure of the first component falls below a predetermined value.

23. An apparatus (10) as set forth in claim 22 further characterized by said safety shut down means including a compressed air sensor (188) for actuating said safety shut down means in the event the static pressure of the compressed air source falls below a predetermined value.

24. An apparatus (10) as set forth in claim 23 further characterized by said safety shut down means including an alarm (192) for alerting an operator in the event said safety shut down means is actuated.

25. An apparatus (10) as set forth in claim 19 further characterized by said mixer means (15) including a flow chamber (152) extending along a central axis thereof and having an upstream end (154) communicating with said control means (62) and a downstream end (156) communicating with said receptacle means (14).

26. An apparatus (10) as set forth in claim 25 further characterized by said mixer means (15) including a plurality of liquid permeable plates (158) spaced axially inside said flow chamber (152).

27. An apparatus (10) as set forth in claim 26 further characterized by including a first exhaust conduit (78) extending between said valve member (64) and said upstream end (154) of said flow chamber (152), and a first check valve (164) disposed along said first exhaust conduit (78) for allowing flow from said valve member (64) to said flow chamber (152) and for preventing flow from said flow chamber (152) to said valve member (64).

28. An apparatus (10) as set forth in claim 27 further characterized by including a second exhaust conduit (80) extending between said valve member (64) and said upstream end (154) of said flow chamber (152), and a second check valve (166) disposed along said second exhaust conduit (80) for allowing flow from said valve member (64) to said flow chamber (152) and for preventing flow from said flow chamber (152) to said valve member (64).

29. An apparatus (10) as set forth in claim 26 further characterized by each of said left (18) and right (20) pumps including stroke limiter means (168) for adjusting the displacement of at least one of said respective first (38, 50) and second (44, 56) pistons.

30. An apparatus (10) as set forth in claim 29 further characterized by said stroke limiter means (168) including a sleeve disposed about said piston rod (40, 46, 52, 58) of said first (38, 50) and second (44, 56) pistons.

31. An apparatus (10) as set forth in claim 29 further characterized by said comparator means (82) including dwell means for delaying the signal sent to said control means (62) for a predetermined period of time.

32. An apparatus (10) as set forth in claim 31 further characterized by said dwell means including at least one needle valve (104, 106) disposed upstream of said air cylinder (96).

33. An apparatus (10) as set forth in claim 31 further characterized by including a fluid pump (170) disposed upstream of said control means (62) for moving the first component from a supply to said control means (62).

34. A method for combining into a uniform mixture two liquid components, said method comprising the steps of: measuring a predetermined volume of a first liquid component, measuring a predetermined volume of a second liquid component, simultaneously pumping the measured first and second components to a receptacle (14), mixing the first and second liquid components together, and characterized by simultaneously and continuously measuring and pumping the predetermined volumes of the first and second components without loss of flow to the receptacle (14).

35. A method as set forth in claim 34 further characterized by moving the first and second components to a left pump (18), moving the first and second components to a right pump (20), measuring the first and second components with the left pump (18) while pumping the first and second components with the right pump (20), and pumping the first and second components with the left pump (18) while measuring the first and second components with the right pump (20).

36. A method as set forth in claim 35 further characterized by expanding the volumes of two cylinders (22, 24, 26, 28) of each the left (18) and right (20) pumps to a predetermined volume to measure the first and second components, and contracting the volumes of the two cylinders (22, 24, 26, 28) of the left (18) and right (20) pumps to a predetermined volume to pump the first and second components.

37. A method as set forth in claim 36 further characterized by adjusting the expansion of at least one of the two cylinders (22, 24, 26, 28) of the left (18) and right (20) pumps to alter the mixing ratio between the first and second components.

38. A method as set forth in claim 37 further characterized by initiating the pumping step of the left pump (18) when the volumes of the two cylinders (26, 28) of the right pump (20) are fully contracted, and initiating the measuring step of the left pump (18) when the volumes of the two cylinders (26, 28) of the right pump (20) are fully expanded.

39. A method as set forth in claim 38 further characterized by initiating the pumping step of the right pump (20) when the volumes of the two cylinders (22, 24) of the left pump (18) are fully contracted, initiating the measuring step of the right pump (20) when the volumes of the two cylinders (22, 24) of the left pump (18) are fully expanded.

40. A method as set forth in claim 39 further characterized by mixing the first and second components by combining and agitating the two flows upstream of the receptacle (14).

41. A method as set forth in claim 40 further characterized by moving a valve member (64) between a first fluid directing position wherein the first and second components are directed toward the left pump (18) and away from the right pump (20), and a second fluid directing position wherein the first and second components are directed away from the left pump (18) and toward the right pump (20).

42. A method as set forth in claim 41 further characterized by regulating the static air pressure inside the receptacle (14).

43. A method as set forth in claim 42 further characterized by regulating the static pressure in the receptacle (14) by comparing the static pressure in the receptacle (14) with the air pressure in a compressed air source (90).

44. A method as set forth in claim 42 further characterized by stopping the continuous movement of the first and second components to the receptacle (14) in the event an upper level sensor (146) in the receptacle (14) is actuated.

45. A method as set forth in claim 44 further characterized by restarting the continuous movement of the mixed first and second components to the receptacle (14) in the event a middle level sensor (148) spaced vertically below the upper level sensor (146) in the receptacle (14) is actuated.

46. A method as set forth in claim 45 further characterized by moving the mixed first and second components from the receptacle (14) to a workstation.

47. A method as set forth in claim 46 further characterized by preventing the movement of the mixed first and second components from the receptacle (14) in the event a lower level sensor (150) spaced vertically below the middle level sensor (148) in the receptacle (14) is actuated.

48. A method as set forth in claim 47 further characterized by automatically shutting down the method in the event a fault condition occurs.

49. A method as set forth in claim 48 further characterized by producing an alarm signal in the event a fault condition occurs.

50. A method as set forth in claim 47 further characterized by allowing movement of the first and second liquid components from the valve member (64) to the receptacle (14) while preventing movement of the first and second components from the receptacle (14) to the valve member (64).

* * * * *